US008723663B2

(12) United States Patent
Stahlkopf

(10) Patent No.: US 8,723,663 B2
(45) Date of Patent: May 13, 2014

(54) CONTROL APPARATUS FOR DRIVING A LUMINAIRE AND LUMINAIRE

(75) Inventor: Andreas Stahlkopf, Bielefeld (DE)

(73) Assignee: Traxon Technologies Europe GmbH, Paderborn (DE)

( * ) Notice: Subject to any disclaimer, the term of this patent is extended or adjusted under 35 U.S.C. 154(b) by 182 days.

(21) Appl. No.: 13/194,373

(22) Filed: Jul. 29, 2011

(65) Prior Publication Data

US 2012/0104969 A1 May 3, 2012

(30) Foreign Application Priority Data

Jul. 29, 2010 (DE) ......................... 10 2010 032 760

(51) Int. Cl.
*B60Q 1/26* (2006.01)
*G05B 19/00* (2006.01)

(52) U.S. Cl.
USPC ........................................... 340/468; 340/501

(58) Field of Classification Search
USPC .......... 315/291, 307, 312, 246; 340/468, 469, 340/5.1, 5.21, 5.22, 5.23, 5.24, 5.25
See application file for complete search history.

(56) References Cited

U.S. PATENT DOCUMENTS

| | | | | |
|---|---|---|---|---|
| 5,528,595 | A | 6/1996 | Walsh et al. | |
| 6,777,891 | B2 | 8/2004 | Lys et al. | |
| 6,848,219 | B2 | 2/2005 | Standard et al. | |
| 7,358,929 | B2 | 4/2008 | Mueller et al. | |
| 7,646,173 | B1 | 1/2010 | Coleman | |
| 2002/0025004 | A1 | 2/2002 | Aarts | |
| 2003/0057886 | A1 | 3/2003 | Lys et al. | |
| 2004/0240890 | A1 | 12/2004 | Lys et al. | |
| 2006/0001387 | A1 | 1/2006 | Chansky et al. | |
| 2006/0082331 | A1 | 4/2006 | Ashdown | |
| 2006/0109204 | A1 | 5/2006 | Chen | |
| 2007/0236156 | A1* | 10/2007 | Lys et al. | 315/291 |
| 2007/0237284 | A1* | 10/2007 | Lys et al. | 377/19 |
| 2008/0122607 | A1* | 5/2008 | Bradley | 340/468 |
| 2008/0225372 | A1 | 9/2008 | Hewlett et al. | |

FOREIGN PATENT DOCUMENTS

| | | |
|---|---|---|
| CN | 1484462 | 3/2004 |
| CN | 101658068 | 2/2010 |
| DE | 20 2007 002 315 | 4/2008 |
| WO | WO 2008/059445 | 5/2008 |

OTHER PUBLICATIONS

"SN54HC125, SN74HC125 Quadruple Bus Buffer Gates With 3-State Outputs", SCLS104D, pp. 1-2, Copyright 2003, Texas Instruments Inc.

* cited by examiner

*Primary Examiner* — Minh D A
(74) *Attorney, Agent, or Firm* — Cozen O'Connor

(57) ABSTRACT

A control apparatus (100) for driving a luminaire with, a signal input (101), a signal output (102), and a signal processing apparatus (104), in which the signal input (101) is configured to receive a serial input signal (21) of the length N, the signal processing apparatus (104) is configured to shorten the input signal (21) by a control signal (23) of the length n, the signal output (101) is configured to output an output signal (22), which comprises the input signal (21) shortened by the control signal (23), and the signal processing apparatus (104) comprises a UART (11) and a switching element (10), the UART (11) being configured to switch the switching element (10) as the control signal (23) is input, with the result that the switching element (10) shortens the input signal (21) by the control signal (23).

14 Claims, 3 Drawing Sheets

CONTROL APPARATUS FOR DRIVING A LUMINAIRE AND LUMINAIRE

RELATED APPLICATIONS

This application claims the priority of German application no. 10 2010 032 760.3 filed Jul. 29, 2010, the entire content of which is hereby incorporated by reference.

FIELD OF THE INVENTION

The invention is related to a control apparatus for driving a luminaire. Furthermore, the invention is related to a luminaire with such a control apparatus.

SUMMARY OF THE INVENTION

One object of the invention is to provide a control apparatus which can be produced in a particularly cost-effective manner.

In accordance with at least one embodiment of the control apparatus, the control apparatus comprises a signal input, a signal output and a signal processing apparatus. In this case, the signal input is configured to receive an input signal, and the signal output is configured to output an output signal. The signal processing apparatus is configured to process the input signal to give the output signal.

For example, the input signal is a serial input signal. In this case, the input signal can have the length N, measured in bits or bytes, for example.

In accordance with at least one embodiment of the control apparatus, the signal processing apparatus is configured to shorten the input signal by a control signal of the length n. In this case, n≤N.

In accordance with at least one embodiment of the control apparatus, the signal output is configured to output an output signal. The output signal comprises the input signal shortened by the control signal. The output signal can in this case likewise have the length N. The n digit positions of the original input signal which form the control signal are then completely replaced in the output signal by n digit positions in the signal with a low level (logic 0) or high level (logic 1), for example. In other words, the output signal is then the input signal shortened by the information from the control signal.

In accordance with at least one embodiment of the control apparatus, the signal processing apparatus comprises a UART (abbreviation for Universal Asynchronous Receiver Transmitter) and a switching element. The UART is an electronic component which is used for realizing digital serial interfaces. The UART interface in this case serves to transmit and receive data, in this case to receive the input signal.

The switching element is an AND gate or a noninverting buffer, for example.

In accordance with at least one embodiment of the control apparatus, the UART is configured to switch the switching element as the control signal is input, with the result that the switching element shortens the input signal by the control signal.

In accordance with at least one embodiment of the control apparatus for driving a luminaire, the control apparatus comprises a signal input, a signal output and a signal processing apparatus, in which the signal input is configured to receive a serial input signal of the length N, the signal processing apparatus is configured to shorten the input signal by a control signal of the length n, and the signal output is configured to output an output signal which comprises the input signal shortened by the control signal. In this case, the signal processing apparatus comprises a UART and a switching element, the UART being configured to switch the switching element as the control signal is received, with the result that the switching element shortens the input signal by the control signal.

In this case, the control apparatus is configured, for example, to process a so-called DMX (abbreviation for Digital Multiplex) signal or a DMX-like signal.

In this case, a DMX signal is a serial signal, in which data are transmitted at a transmission rate of 250 kbit/s. The DMX signal comprises 513 bytes, with the first byte being a start code which communicates the nature of the data to be transmitted to a receiver. The DMX signal can be transmitted via a three-pole or a five-pole data line, for example.

A DMX-like signal can in this case be a signal in which the transmission rate is increased. For example, the DMX-like signal has a transmission rate of >500 kbit/s, for example 1 Mbit/s. DMX-like signals in this case also include a bidirectional data transmission, for example via RDM (Remote Device Management). Bidirectional communication, in particular via DMX data links, between components is possible via RDM.

In this case, the DMX signal or the DMX-like signal is particularly well suited to driving a luminaire, which comprises at least one light-emitting diode chip, preferably a large number of light-emitting diode chips, as light sources. For example, a control signal for driving an individual light-emitting diode chip can have a length of 1 byte. The addressing of the byte is not possible for a DMX signal or a DMX-like signal, however. In this case, the control apparatus therefore uses a so-called auto-addressing method, in which the signal processing apparatus of the control apparatus draws the control signal from the serial input signal. In this case, the control signal has the length which is required for driving the light sources managed by the control apparatus, for example light-emitting diode chips. If the luminaire comprises a single RGB LED with a red light-emitting diode chip, a green light-emitting diode chip and a blue light-emitting diode chip, for example, the control apparatus draws a control signal with a length of n=3 bytes and passes on the input signal shortened by the control signal, as output signal, to a further control apparatus, for example, which is provided for driving a further luminaire.

In order to implement such an auto-addressing method, in principle relatively expensive integrated circuits, such as so-called FPGAs (abbreviation for Field Programmable Gate Array) or so-called ASICs (Application-Specific Integrated Circuits) can be used, for example.

In this case, however, one possibility is specified for how a control apparatus, which is suitable for auto-addressing when using a serial data protocol, can be implemented as inexpensively as possible. In this case, a simple, cost-effective microcontroller can be used, for example, for the auto-addressing. That is to say that the present control apparatus is also characterized by the fact that a microcontroller, preferably a single microcontroller per luminaire, is used for the auto-addressing.

In accordance with at least one embodiment of the control apparatus, the UART and the switching element are configured to receive the input signal. For example, the input signal is applied to both the UART and the switching element. The UART switches the switching element in the event of the occurrence of the control signal, with the result that the switching element can shorten the input signal by the control signal. The input signal shortened by the control signal then results as output signal at the switching element on the output side.

In accordance with at least one embodiment of the control apparatus, the UART is configured to identify a break signal, with the break signal indicating the beginning of the control signal.

For example, the break signal may be a signal with a low level (logic 0) which is identified by the UART as invalid data byte with no stop bit. In the case of a DMX packet, the length of the break signal is at least 88 μs, which corresponds to 22 bit lengths with a bit length of 4 μs. Owing to the break signal, the UART can switch the switching element by means of an interrupt signal, for example.

In accordance with at least one embodiment of the control apparatus, the control apparatus, for example the signal processing apparatus, comprises a capture/compare unit. The capture/compare unit is configured to determine the duration of the break signal. This has proven to be particularly advantageous if a DMX-like protocol with, for example, an increased data transmission rate of greater than or equal to 500 kbit/s, for example, is used as data protocol.

In this case, the control apparatus described here is based on the concept, inter alia, of enabling identification of the transmission protocol used for transmitting the input signal for the control apparatus on the basis of the duration of the break signal. In other words, the transmission protocol of the control apparatus is indicated by a duration of the break signal, which is below the minimum duration of 88 μs which is conventional for DMX packets, for example.

In the present case, the control apparatus, in particular the signal processing apparatus of the control apparatus, is configured to identify a break signal with a duration of ≤70 μs, for example of at least 50 μs and at most 70 μs and to determine the protocol used for transmitting the input signal on the basis of the duration of the break signal. In other words, the control apparatus is configured to determine the protocol used for transmitting the input signal from the duration of the break signal. In this case, it is possible for the break signal to be detected exclusively by virtue of its length, i.e. exclusively using the capture/compare unit.

The control apparatus described here thus also allows the use of DMX-like transmission protocols which can have transmission rates of 500 kbit/s or more.

In accordance with at least one embodiment of the control apparatus, the UART is a component of a microcontroller. In addition, it is possible for the capture/compare unit to also be a component of a microcontroller. The UART and the capture/compare unit can in this case be components of the same microcontroller, which, in addition to the addressing, i.e. the extraction of the control signal provided for the luminaire, can also perform further control functions for the luminaire.

In accordance with at least one embodiment of the control apparatus, the switching element is arranged outside the microcontroller. In this way, it is possible to use a standard microcontroller, which makes it possible to use a particularly inexpensive control apparatus.

In accordance with at least one embodiment of the control apparatus, the signal processing apparatus of the control apparatus, which is configured for shortening the input signal by a control signal of the length n, comprises a single UART. In principle, it would be possible for a second UART to be used for the data output. However, a second UART for the data output delays the transmission to the downstream control apparatuses of the downstream luminaires. A data item would first need to be received, stored in the buffer and then serialized with the second UART. This procedure causes a temporal delay with respect to the input signal. In the case of many luminaires arranged in series, these delays add up, which can result in visible delays, for example in the representation of video images on the luminaires.

In accordance with at least one embodiment of the control apparatus, the control apparatus comprises a gamma correction unit, which is configured to process the control signal with an eye sensitivity curve.

In accordance with at least one embodiment of the control apparatus, the gamma correction unit is configured to extend the control signal or part of the control signal, which is provided for precisely one light-emitting diode chip, for example, and has a length of at most 10 bits, in particular at most or precisely 8 bits, to a corrected control signal with a length of at least 12 bits, in particular to at least or precisely 14 bits. In particular for low current intensities to be output to a light-emitting diode chip, for example, and therefore for low brightness values of the light generated by the light-emitting diode chip during operation, it is thus possible to adapt sufficiently well to the comparatively high sensitivity of the human eye for low brightnesses. In particular for such low brightnesses, a control signal with a length of 8 bits is insufficient for a single light-emitting diode chip, since the human eye is comparatively sensitive at low brightnesses. Owing to the gamma correction unit of the control apparatus, the signal with a length of 8 bits, for example, is interpolated into a signal with more bits, for example 14 bits.

Furthermore, one aspect of the invention is directed to a luminaire. The luminaire comprises at least one control apparatus, as is described here, i.e. all of the features described for the control apparatus are also disclosed for the luminaire.

In addition, the luminaire comprises at least one light-emitting diode chip, preferably a large number of light-emitting diode chips. The light-emitting diode chips are in this case energized depending on the control signal or the corrected control signal. The control apparatus is in this case suitable for extracting the control signal for the light-emitting diode chips of the luminaire from the input signal and passing on the input signal shortened by the control signal, as output signal, to a further control apparatus, which is part of a similar luminaire, for example.

BRIEF DESCRIPTION OF THE DRAWINGS

The control apparatus described here and the luminaire described here will be explained in more detail below with reference to exemplary embodiments and the associated figures.

DETAILED DESCRIPTION OF THE DRAWINGS

Identical, similar or functionally identical elements have been provided with the same reference symbols in the figures. The figures and the size ratios of the elements illustrated in the figures with respect to one another should not be considered as being to scale. Instead, individual elements can be illustrated with exaggerated dimensions for reasons of a clearer illustration and/or better understanding.

Figure 1:
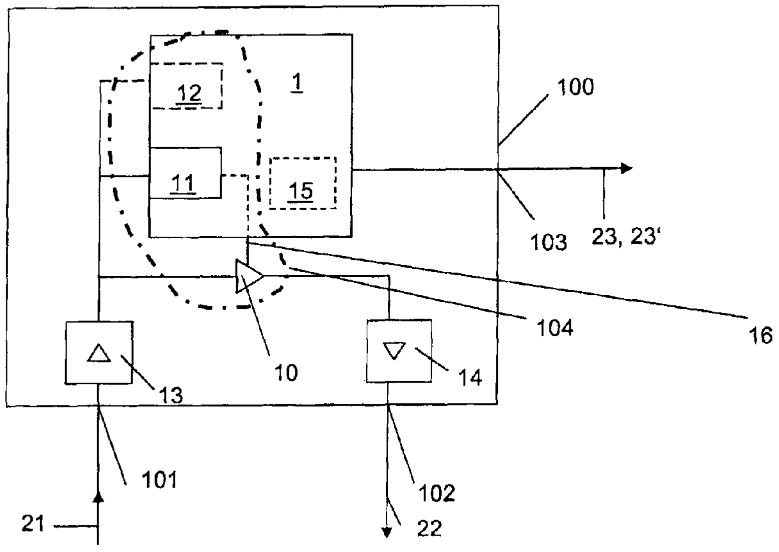
FIG. 1 shows a control apparatus described here using a schematic plan view in accordance with a first exemplary embodiment.

FIG. 1 shows a schematic plan view of a control apparatus described here. The control apparatus 100 has a signal input 101. An input signal 21 passes into the control apparatus 100 via the signal input 101. The input signal 21 is in this case a serial data signal, which is formed by a DMX signal or a DMX-like signal, for example. The input signal 21 comprises a control signal 23.

The control apparatus 100 further comprises a signal processing device 104. The signal processing apparatus 104 is intended to shorten the input signal 21 by the control signal 23 of the length n and to extract the control signal 23. In this case, the signal processing apparatus 104 comprises a UART 11 for this purpose. In addition, the signal processing apparatus 104 comprises a switching element 10.

The switching element 10 can be a gate or a non-inverting buffer, for example. The component part SN74HC125 by Texas Instruments is used as non-inverting buffer, for example. In the exemplary embodiment in FIG. 1, the switching element 10 is in particular a logic AND gate.

Optionally, the signal processing apparatus 104 can comprise a capture/compare unit 12.

The control apparatus 100 further comprises drivers 13, 14 at a signal input and signal output, respectively. The control apparatus 100 comprises a signal output 102, at which the output signal 22 is output, said output signal 22 comprising the input signal 21 shortened by the control signal.

During operation of the control apparatus 100, the input signal 21 passes to the UART and to the switching element via the driver 13. That is to say that both the UART and the switching element are connected to the signal input 101 and are configured to receive the input signal 21. For example, the UART identifies a break signal in the input signal, said break signal indicating the beginning of the control signal. The UART 11 then switches the switching element 10, and the switching element 10 shortens the input signal 21 by the control signal 23 by a logic AND operation, for example. At the output of the switching element 10, the output signal 22 is produced, which leaves the control apparatus 100 at the signal output 102 in the direction of a downstream control apparatus, for example.

Optionally, the control apparatus 100 and in this case in particular the signal processing apparatus 104 can comprise the capture/compare unit 12, which can determine the duration of the break signal. For example, the break signal can then be a low level (logic 0) with a length of ≤70 μs. The identification of the length of the break signal makes it possible to use quick, DMX-like protocols, for example.

In this case, the UART 11 and the capture/compare unit are part of a microcontroller 1. The switching element 10 is arranged outside the microcontroller 1.

The microcontroller 1 can optionally comprise the gamma correction unit 15, which is configured to extend the extracted control signal 23 to an extended, corrected control signal 23' as described above.

The control apparatus 100 further comprises a control signal output 103, at which the control signal 23 or the corrected control signal 23' leaves the control apparatus 100. The control signal 23 or the corrected control signal 23' can then be used, for example, for driving a pulse width modulation circuit, which for its part operates light-emitting diode chips connected thereto.

The pulse width modulation circuit can in this case likewise be part of the control apparatus and also be integrated in the microcontroller 1, for example.

Figure 2:
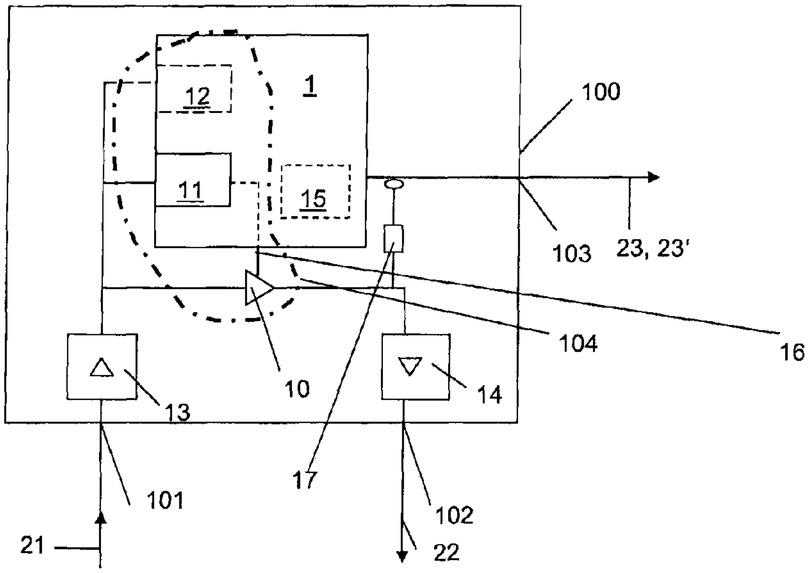
FIG. 2 shows a control apparatus described here using a schematic plan view in accordance with a second exemplary embodiment.

In FIG. 2, a further exemplary embodiment of a control apparatus described here is explained in more detail using a schematic plan view. In contrast to the exemplary embodiment in FIG. 1, the switching element is formed by a non-inverting buffer. Since the buffer is a tri-state buffer, i.e. can assume a third state in addition to "0" and "1", the control apparatus 100 additionally comprises a so-called pull-up resistor, which can ensure a defined signal level.

During operation, a control apparatus 100 as shown in FIG. 1 or 2 functions as follows, for example:

1. The control element 10 is switched on at the system start via the control input (for example /OE) and data present at the input are output with a minimal delay. This takes place by means of a microcontroller I/O 16, for example.

2. The microcontroller 1 detects a break signal (for example a DMX break) and leaves the control input of the control element 10 unchanged. The identification of the break signal can in this case take place in at least one of the following ways:

a. The break signal is identified via a UART error (stop bit logic zero) and/or b. The capture/compare unit 12 of the microcontroller 1 measures the length of the break signal.

3. The start code of the signal is interpreted and the control element 10 is switched correspondingly:

a. If the start code corresponds to light control information, i.e. a control signal 23, the control element 10, for example the buffer, is deactivated.

b. If a different type of control information is then transmitted, the control element 10 remains active and only a renewed break signal with a subsequent start code would result in a renewed decision process.

4. Once all of the information required for the luminaire has been received, i.e. the control signal 23 has been received, the control element 10 is switched on, with the result that subsequent data reach the next control device unchanged.

The interplay between the microcontroller and, for example, the control element 10 in the form of a non-inverting buffer is in this case as follows:

The input signal 21 has two stop bits, for example, which are logic "1". During these stop bits, the control element 10 needs to be manipulated. If this does not take place during the stop bits, undesired interference arises, which could irritate downstream control apparatuses 100.

In accordance with a first configuration, the microcontroller can generate an interrupt as soon as when the second stop bit is read, i.e. temporally approximately in the center of the bit. In this case, the interrupt routine still has sufficient time to switch the control element 10 on or off by means of an interface, for example a general purpose IO.

In accordance with an alternative configuration, the interrupt latency of the microcontroller is too great and the control element 10 cannot be switched sufficiently quickly. In this case, the control element is preferably switched as early as when the first stop bit is reached.

Figure 3:
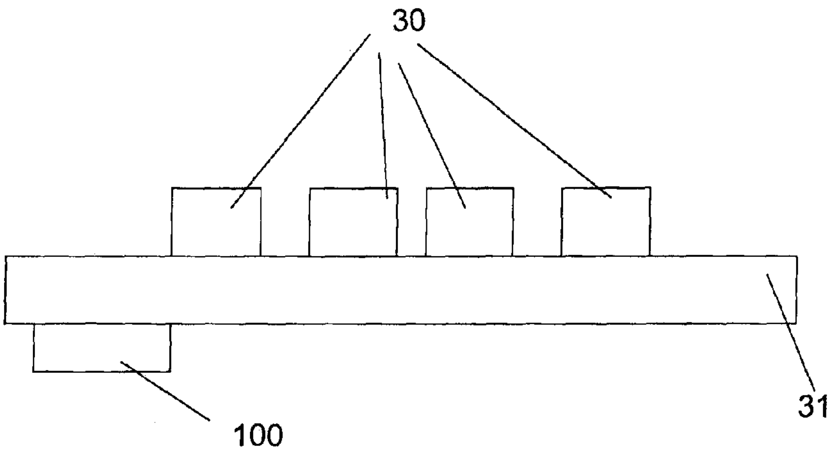
FIG. 3 shows a luminaire described here using a schematic sectional illustration.

In conjunction with the schematic sectional illustration in FIG. 3, a luminaire with a control apparatus 100 described here is described in more detail. The luminaire comprises a connection mount 31, for example. The connection mount 31 is, for example, a circuit board, such as a printed circuit board, a flexible printed circuit board or a metal-core circuit board. Connection points and conductor tracks (not shown) are structured into and/or onto the connection mount 31, it being possible for contact to be made and electrically conductive connection to be made with the components arranged on the connection mount 31. In this case, the control apparatus 100 is arranged on a lower side of the connection mount 31. Light-emitting diode chips 30, which can also be combined in groups, for example, to give light-emitting diodes with a red light-emitting diode chip, a blue light-emitting diode chip and two green light-emitting diode chips, for example are arranged on the upper side facing away from the lower side. The control apparatus filters the information required for operating the light-emitting diode chips 31, i.e. the control signal 23, out from the input signal 21.

The invention is not restricted to the exemplary embodiments by the description with reference to these exemplary embodiments. Instead, the invention includes any novel feature and any combination of features which contains in particular any combination of features in the patent claims, even if this feature or this combination is itself not explicitly specified in the patent claims or exemplary embodiments.

The invention claimed is:

1. A control apparatus for driving a luminaire, comprising:
- a signal input configured to receive a serial input signal of a length N;
- a signal processing apparatus configured to shorten the serial input signal by a control signal of a length n;
- a signal output configured to output an output signal, which comprises the serial input signal shortened by the control signal; and
- a signal processing apparatus that comprises:
  - a switching element; and
  - a UART configured to switch the switching element as the control signal is input so that the switching element shortens the serial input signal by the control signal and to identify a break signal, the break signal indicating a beginning of the control signal; and
- a capture/compare unit configured to determine a duration of the break signal,
- wherein the control apparatus is configured to determine a protocol used for a transmission of the serial input signal based at least in part on the duration of the break signal.

2. The control apparatus according to claim 1, wherein the UART and the switching element are configured to receive the serial input signal.

3. The control apparatus according to claim 1, wherein the control apparatus is configured to identify a break signal with a duration of less than or equal to 70 μs.

4. The control apparatus according to claim 1, wherein the UART is a component of a microcontroller.

5. The control apparatus according to claim 1, wherein the capture/compare unit is a component of a microcontroller.

6. The control apparatus according to claim 1, further comprising a microcontroller which comprises the UART and the capture/compare unit.

7. The control apparatus according to claim 6, wherein the switching element is arranged outside the microcontroller.

8. The control apparatus according to claim 1, wherein the signal processing apparatus comprises a single UART.

9. The control apparatus according to claim 1, further comprising a gamma correction unit, which is configured to process the control signal with an eye sensitivity curve.

10. The control apparatus according to claim 9, wherein the gamma correction unit is configured to extend the control signal or part of the control signal by a length of at most 10 bits to a corrected control signal with a length of at least 12 bits.

11. The control apparatus according to claim 9, wherein the gamma correction unit is configured to extend the control signal or part of the control signal by a length of at most or precisely 8 bits to a corrected control signal with a length of at least or precisely 14 bits.

12. The control apparatus according to claim 1, wherein the switching element is formed by a gate or a non-inverting buffer.

13. A luminaire comprising:
- at least one control apparatus according to claim 1, and
- at least one light-emitting diode chip, the light-emitting diode chip being energized depending on the control signal or a corrected control signal.

14. A control apparatus for driving a luminaire, comprising:
- a signal input configured to receive a serial input signal of the length N;
- a signal processing apparatus configured to shorten the serial input signal by a control signal of the length n;
- a signal output configured to output an output signal, which comprises the serial input signal shortened by the control signal; and
- a signal processing apparatus that comprises:
  - a switching element; and
  - a UART configured to switch the switching element as the control signal is input such that the switching element shortens the serial input signal by the control signal,
- wherein the control apparatus is configured to determine a protocol used for transmitting the serial input signal based at least in part on a duration of a break signal in the serial input signal.

* * * * *